(No Model.)

O. VANORMAN.
BUCKBOARD WAGON.

No. 279,894. Patented June 19, 1883.

Witnesses.
Louis F. Gardner
J. W. Garner

Inventor.
Oliver Vanorman,
per
F. A. Lehmann,
Atty.

UNITED STATES PATENT OFFICE.

OLIVER VANORMAN, OF RACINE, WISCONSIN.

BUCKBOARD-WAGON.

SPECIFICATION forming part of Letters Patent No. 279,894, dated June 19, 1883.

Application filed March 27, 1883. (No model.)

*To all whom it may concern:*

Be it known that I, OLIVER VANORMAN, of Racine, in the county of Racine and State of Wisconsin, have invented certain new and useful Improvements in Buckboard-Wagons; and I do hereby declare the following to be a full, clear, and exact description of the invention, such as will enable others skilled in the art to which it pertains to make and use it, reference being had to the accompanying drawings, which form part of this specification.

My invention relates to an improvement in buckboard-wagons; and it consists in the combination of a spring, which is supported between the rear ends of the shafts, and which is provided with stops, so as to limit the distance the shafts are turned toward either side, all of which will be more fully described hereinafter.

The object of my invention is to secure the shafts rigidly to the front axle, and then support the only spring which is used under the buckboard, between the rear ends of the shafts, and make this spring form the support for the fifth-wheel, thereby simplifying and cheapening the construction of the wagon to a very great extent.

Figure 1:
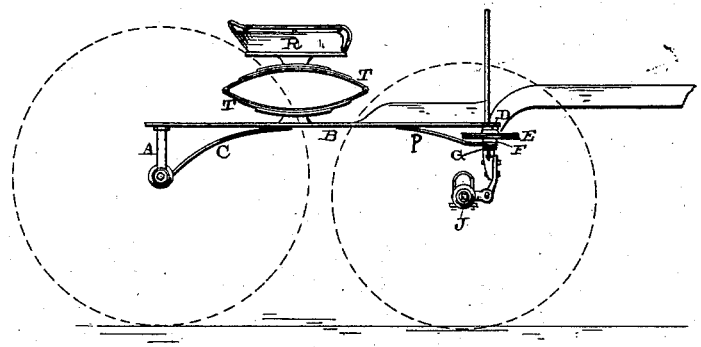
Figure 2:
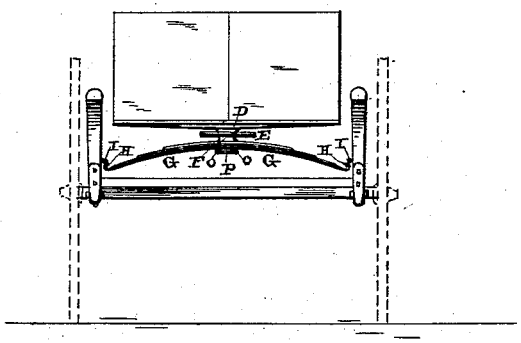
Figure 3:
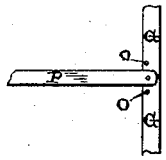

Figure 1 is a side elevation of a wagon embodying my invention. Fig. 2 is a front view of the same. Fig. 3 is a detail view.

A represents the rear axle, which is bent upward, and has the buckboard B secured rigidly upon its top. In between the board and the top of the axle is secured a layer of rubber, felt, or other elastic material, which will give the board a slight play. This axle and the buckboard are rigidly braced together by means of the rods or braces C, which serve to keep the two parts always in their relative positions. Secured under the front end of the buckboard is the bolster D, to the under side of which is fastened the upper portion of the fifth-wheel E. The lower and movable portion of this fifth-wheel is secured upon the top of the block F, which is fastened securely to the spring G, which is supported, by means of the links H and hooks I, in between the rear ends of the shafts. The king-bolt is passed up through the brace, the bottom of the spring, the block upon its top, the fifth-wheel, the bolster, and the buckboard just in the rear of the dasher-board. The shafts are secured rigidly to the front axle, J, and the axle-shafts and spring can be turned freely together toward either side of the vehicle until one of the stops, O, on the under side of the spring strikes against the brace P, which is secured at its rear end to the under side of the buckboard and at its front end upon the king-bolt. These stops project downward upon opposite sides of the king-bolt, and serve to prevent the shafts from turning too far around without affecting the buckboard itself. As only the front end of the buckboard is supported upon a spring, the seat R is supported upon two, three, or more springs, T, of any suitable construction, as shown. These springs under the seat give it sufficient elasticity to allow the wagon to be used upon the roughest roads. By thus suspending the spring at the front end of the wagon, between the shafts, and forming the fifth-wheel directly upon the top of the spring, the construction of the wagon is very greatly simplified and cheapened.

Having thus described my invention, I claim—

In a buckboard-wagon, the combination of the buckboard, the fifth-wheel, the spring suspended between the rear ends of the shafts, and provided with stops, and the brace P, substantially as set forth.

In testimony whereof I affix my signature in presence of two witnesses.

OLIVER VANORMAN.

Witnesses:
 ISAAC A. WRIGHT,
 L. H. BEYERLE.